United States Patent
Su et al.

(10) Patent No.: US 9,286,805 B2
(45) Date of Patent: Mar. 15, 2016

(54) LANE DEPARTURE WARNING SYSTEM, LANE IDENTIFICATION APPARATUS AND RELATED METHOD THEREOF

(71) Applicant: PixArt Imaging Inc., Hsin-Chu (TW)

(72) Inventors: Tse-Chung Su, Hsin-Chu (TW); Ming-Tsan Kao, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 303 days.

(21) Appl. No.: 13/951,483

(22) Filed: Jul. 26, 2013

(65) Prior Publication Data

US 2014/0192195 A1 Jul. 10, 2014

(30) Foreign Application Priority Data

Jan. 8, 2013 (TW) .............................. 102100619 A

(51) Int. Cl.
*G08G 1/16* (2006.01)
*B60Q 1/00* (2006.01)
*H04N 7/18* (2006.01)
*G08B 23/00* (2006.01)
*G08G 1/00* (2006.01)

(52) U.S. Cl.
CPC ...................................... *G08G 1/167* (2013.01)

(58) Field of Classification Search
CPC ...................................................... G08G 1/167
USPC ......................................................... 348/148
See application file for complete search history.

(56) References Cited

U.S. PATENT DOCUMENTS

| | | | |
|---|---|---|---|
| 8,311,283 B2 | 11/2012 | Wu | |
| 2005/0128061 A1* | 6/2005 | Yanai | 340/435 |
| 2012/0101712 A1 | 4/2012 | Schramm | |
| 2013/0113910 A1* | 5/2013 | Kim | 348/77 |
| 2014/0062724 A1* | 3/2014 | Varoglu et al. | 340/902 |
| 2015/0097661 A1* | 4/2015 | Nilsson | 340/439 |

FOREIGN PATENT DOCUMENTS

| | | |
|---|---|---|
| CN | 1945207 A | 4/2007 |
| CN | 101470801 A | 7/2009 |
| CN | 202358096 U | 8/2012 |
| CN | 102658800 A | 9/2012 |
| EP | 1 790 542 B1 | 6/2008 |
| JP | 200518211 A | 1/2005 |
| JP | 4352442 | 10/2009 |
| TW | 201033049 | 9/2010 |

* cited by examiner

*Primary Examiner* — Hee-Yong Kim
(74) *Attorney, Agent, or Firm* — Winston Hsu; Scott Margo

(57) ABSTRACT

The present invention provides a lane departure warning system including an image sensing device, an identification module and a determination module. The image sensing device generates a video. The identification module identifies a plurality of lane lines of at least one lane on which a vehicle is currently driven from the video, to generate an identification result, wherein the identification result is generated based on specific borderlines of the lane lines. The determination module determines a determination strategy according to vehicle speed information, and generates a determination result according to the determination strategy and the identification result. The lane departure warning system determines whether to issue a warning according to the determination result.

14 Claims, 8 Drawing Sheets

LANE DEPARTURE WARNING SYSTEM, LANE IDENTIFICATION APPARATUS AND RELATED METHOD THEREOF

BACKGROUND OF THE INVENTION

1. Field of the Invention

The disclosed embodiments of the present invention relate to video processing, and more particularly, to a lane departure warning system for detecting if a vehicle departs from its lane by lane identification techniques and specific determination strategies, and related apparatus thereof.

2. Description of the Prior Art

The lane departure warning system is an active driving safety technique for detecting if a vehicle departs from its lane. When a driver drives a vehicle to depart from the current lane without utilizing a blinker due to mental incompetence or negligence, the lane departure warning system will detect this abnormal situation and issue a warning message to remind the driver to drive the vehicle back to the lane.

The existing lane departure warning system architecture can be divided into the following types: the image sensing type, the laser sensing type, and the infrared sensing type. The most common type is the image sensing type, and this type of lane departure warning system will record the drive video first, analyze the drive video, and judge if lane departure occurs according to the current lane identified by referring to images of the road.

However, the roadway is usually marked by various kinds of lane lines with different shapes (e.g., solid lines, dotted lines, broken lines, solid double lines, broken double lines, solid/broken lines, and channelizing lines), and also there are various kinds of signs and symbols painted on the roadway, thus making the lane identification process complicated. For example, the lane departure warning system has to compare the lane markings in the drive video with all of the known lane lines by using complex algorithms, which usually requires a large amount of computation to complete. In addition, the accuracy of the lane identification is also influenced by environmental factors. For example, the poor and bad weather, including the night time, the rainy weather, etc., causes poor visibility and then makes the lane departure warning system hardly to capture clear drive images, which affects the accuracy of lane recognition. Furthermore, unnecessary warnings may be issued erroneously to confuse the driver. Therefore, to improve the accuracy of lane identification and the reliability of a lane departure warning system has become an important issue in the field.

SUMMARY OF THE INVENTION

Thus, one of the objectives of the present invention is to provide a lane departure warning system and related method, which can adjust the sensitivity adaptively to prevent a driver from the error warning messages by detecting if the vehicle is traveling in a poor environment. Besides, another one of the objectives of the present invention is to provide a lane identification method and related apparatus, which can recognize the lane by detecting the inside borderline of the marking on the roadway to simplify the lane identification process and further improve the accuracy of lane identification.

According to a first embodiment of the present invention, a lane departure warning system is disclosed. The lane departure warning system includes an image sensing device, an identification module, and a determination module. The image sensing device is arranged for generating a video. The identification module is coupled to the image sensing device, arranged for identifying a plurality of lane lines corresponding to at least one lane to generate an identification result, wherein the identification result is generated based on specific borderlines of the lane lines. The determination module is coupled to the identification module, arranged for determining a determination strategy according to vehicle speed information, and generates a determination result according to the determination strategy and the identification result. The lane departure warning system determines whether to issue a warning according to the determination result.

According to a second embodiment of the present invention, a lane departure warning method is disclosed. The lane departure warning method includes: identifying a plurality of lane lines corresponding to one lane to generate an identification result according to a drive video, wherein the identification result is generated based on specific borderlines of the lane lines; determining a determination strategy according to vehicle speed information, and generates a determination result, which indicates lane departure according to the determination strategy and the identification result; and determining whether to issue a warning according to the determination result.

According to a third embodiment of the present invention, a lane departure warning method is disclosed. The lane departure warning method includes: referring to a video to identify at least one lane line corresponding to one lane and accordingly generating an identification result, wherein the identification result is generated based on specific borderlines of the at least one lane line; determining a determination strategy according to vehicle speed information, and generating a determination result, which indicates whether lane departure occurs, according to the determination strategy and the identification result; and determining whether to issue a warning according to the determination result.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

Figure 1:
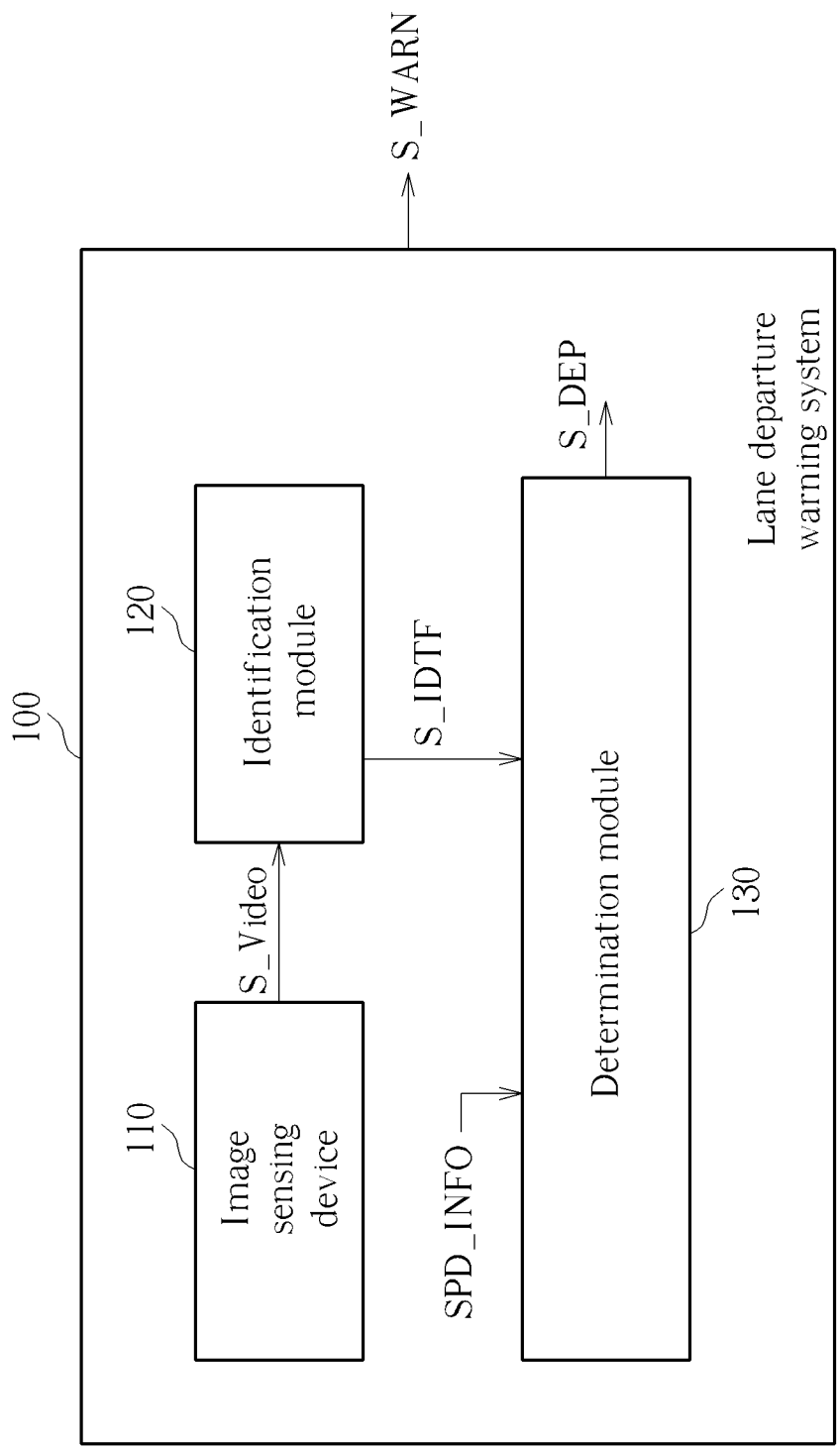
FIG. 1 is a functional block diagram illustrating a lane departure warning system according to an embodiment of the present invention.

The following description would describe the design principles and details of the lane departure warning system and method of the present invention. Please refer to FIG. 1, which is a functional block diagram illustrating a lane departure warning system according to an embodiment of the present invention. As shown in FIG. 1, the lane departure warning system 100 includes an image sensing device 110, an identification module 120, and a determination module 130. The image sensing device 110 is arranged for generating images S_Video. The identification module 120 is coupled to the image sensing device 110, and arranged for recognizing a plurality of lane lines corresponding to at least one lane to generate an identification result S_IDTF, wherein the identification result S_IDTF is generated based on specific borderlines of the lane lines. The determination module 130 is coupled to the identification module 120, and arranged to decide a determination strategy based on vehicle speed information SPD_INFO, and generate a determination result S_DEP based on the determination strategy and the identification result S_IDTF. The lane departure warning system 100 decides whether to issue a warning S_WARN according to the determination result S_DEP. By way of example, the specific borderline may be an inside borderline of a lane whereon a vehicle is traveling.

Figure 2:
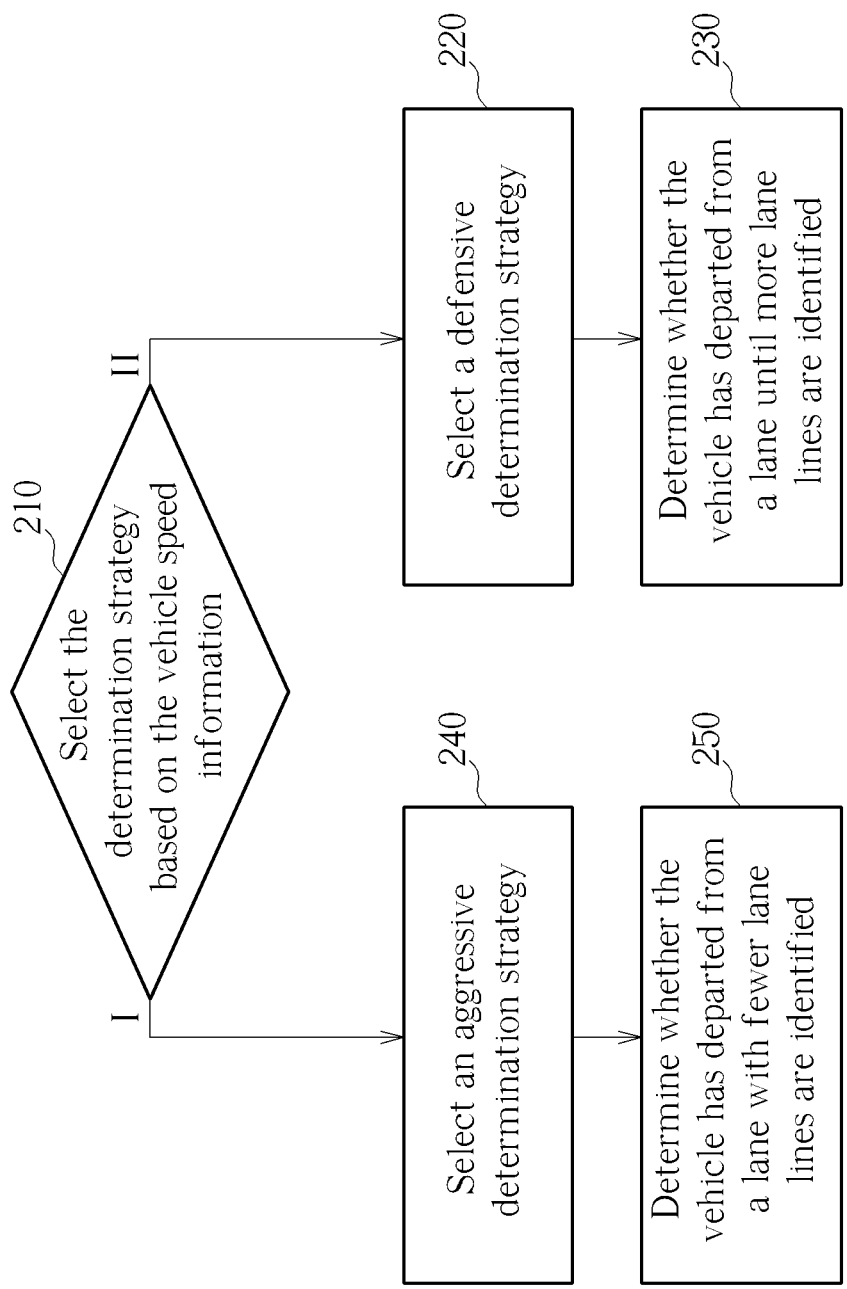
FIG. 2 is a flowchart illustrating how a determination module selects a determination strategy in the lane departure warning system of the present invention.

The details of the determination module 130 would be described first as follows, and the basic principles and operation instructions of the identification module 120 would be described later. Please refer to a flowchart shown in FIG. 2. In step 210, the determining module 130 first selects the determination strategy based on the vehicle speed information SPD_INFO. If the vehicle speed information SPD_INFO indicates that the speed of the vehicle being driven by the driver is within a first speed range, the determination module 130 would select an aggressive determination strategy (step 240). Under this situation that the aggressive determination strategy is selected, when the identification module 120 indicates that the identified lanes are becoming less gradually, the aggressive determination strategy would make the determination module 130 generate the determination result S_DEP which indicates the vehicle has departed from lane (step 250). For example, when the identification module 120 has only identified out a right lane line 330 of a lane 310 shown in the drive image of FIG. 3, the determination module 130 can also refer to this information as well as the lane departure algorithm to generate the determination result S_DEP which indicates the vehicle has departed from a lane. If a defensive determination strategy is selected (step 220), then the determine module 130 would not generate the determination result S_DEP to indicate the vehicle has departed from a lane until there are more lane lines identified by the identification module 120. For example, when the identification module 120 has identified out both the right lane line 330 and the left lane line 320 of the lane 310 shown in FIG. 3, the determination module 130 would generate the determination result S_DEP which indicates the vehicle has departed from a lane according to the identification result S_IDTF and the lane departure algorithm.

The foregoing aims at separating different confidence levels in lane recognition and lane departure determination. In general, when the vehicle speed is high, it often means the vehicle is traveling in a simple environment such as freeway or highway, and also the identification accuracy would be higher. On the contrary, when the vehicle is traveling in a relative complex environment such as urban streets or lanes at the intersection, the roadway is marked by more lines and signs. Too many line markings would probably make the identification module 120 generate an incorrect identification result in the lane line identification stage. For example, the non-lane line may be mistakenly identified as the lane line, thus making the lane departure algorithm go wrong. Accordingly, in accordance with the present invention, when the vehicle is traveling at high speed, the sensitivity of the lane departure warning system 100 would be increased, while when the vehicle is traveling at low speed, the sensitivity of the lane departure warning system 100 would be decreased. When the vehicle speed is within the first speed range I (e.g., the speed is 60 km or more) which is a higher speed range, the aggressive determination strategy would be used to calculate the lane departure. In addition, this determination strategy may affect settings of the parameters of the lane departure algorithm. For example, some more lenient conditions for determining whether lane departure occurs may be established, and warnings would be issued if there is any slightest possibility that the vehicle departs from its lane. And in this determination strategy, even if only one lane line is identified, the lane departure determination will also be performed. However, when the vehicle speed is within a second speed range II (e.g., the speed is lower than 60 km) which is a lower speed range, the defensive determination strategy would be used to calculate the lane departure. It would establish some more stringent conditions for determining whether the lane departure occurs, and issue warnings only if there is a very affirmative result. And in this determination strategy, more than one lane line is needed to be identified for allowing the lane departure determination to be performed.

Furthermore, in addition to determining the strategy according to the vehicle speed information, the strategy may also be determined by driver-defined information in other embodiments of the present invention. In this case, the lane departure warning system of the present invention may provide a driver interface for allowing the driver to select one of the defensive determination strategy and the aggressive determination strategy. When the driver feels lethargic or can't concentrate on driving the vehicle, the lane departure warning system can be switched to the aggressive determination strategy from the defensive determination strategy. In this way, although the error rate may become higher, but it does in return for better detection rate, thereby reducing any possible risk for achieving better traffic safety.

Moreover, the lane departure warning system of the present invention may be disposed in any vehicle, and the vehicle speed information may be provide through a vehicle body signal or a satellite navigation system which is installed on the vehicle.

Through the aforementioned methods, the lane departure warning system 100 of the present invention can determine whether to issue a warning S_WARN according to the determination result S_DEP of the determination module 130. However, if the lane departure warning system 100 of the present invention receives a braking signal or a blinker signal from the vehicle body signal, the lane departure warning system 100 will not issue any warning even if the determination result S_DEP indicates the vehicle has departed from the lane. This is because the driver probably has noticed that the vehicle has departed from the lane, or the driver is currently driving the vehicle to have lane changing.

In an embodiment, the identification module 120 may be a lane line identification module equipped with at least the function of the lane line identification, and the determination module 130 may be a lane departure determining module equipped with at least a function for determining whether the vehicle departs from the lane. Furthermore, the identification module 120 and the determination module 130 may be implemented through a variety of manners, such as a processor that performs the corresponding software, a pure hardware circuit, or a combination of both. The processor may be a general-purpose processor or a specific processor such as a digital signal processor. The software may be stored in a computer readable medium (e.g., an optical disc, a hard disk, a flash memory, a random-access memory (RAM), a read-only memory (ROM), or any other storage device which may be identified and accessed by the processor, and the software may include all kinds of programmable logics, instructions, or necessary information for the implementation of the present invention. In addition, in the pure hardware circuit architecture, the identification module 120 and determining module 130 may include a hard-wired logic, a programmable logic (e.g., Field Programmable Gate Array, FPGA), or a Complex Programmable Logic Device (CPLD), and/or an application-specific integrated circuit (ASIC). Besides, in other different embodiments of the present invention, the identification module 120 and the determination module 130 may be realized using the same circuit element or different circuit elements.

Another embodiment of the present invention provides a lane identification method which is used for identifying a lane whereon a vehicle is traveling. Please refer to the flowchart shown in FIG. 4. In step 410, a drive video is provided, and the drive video may be provided by an image sensing device. Next, in step 420, the line of the lane to which a plurality of lane lines correspond may be recognized according to the drive video, thereby generating an identification result, wherein the identification result is generated based on the inside borderline of the lane line. Taking FIG. 3 for example, in order to identify the correct position of the lane 310 whereon the vehicle is currently traveling, at least one of the left lane line 320 and the right lane line 330 of the lane 310 must be identified from the drive video, and the identification of the lane line can be determined according to the inside borderline of the lane line. Thereafter, in step 430, the lane 310 can be determined according to the identification result.

Figure 3:
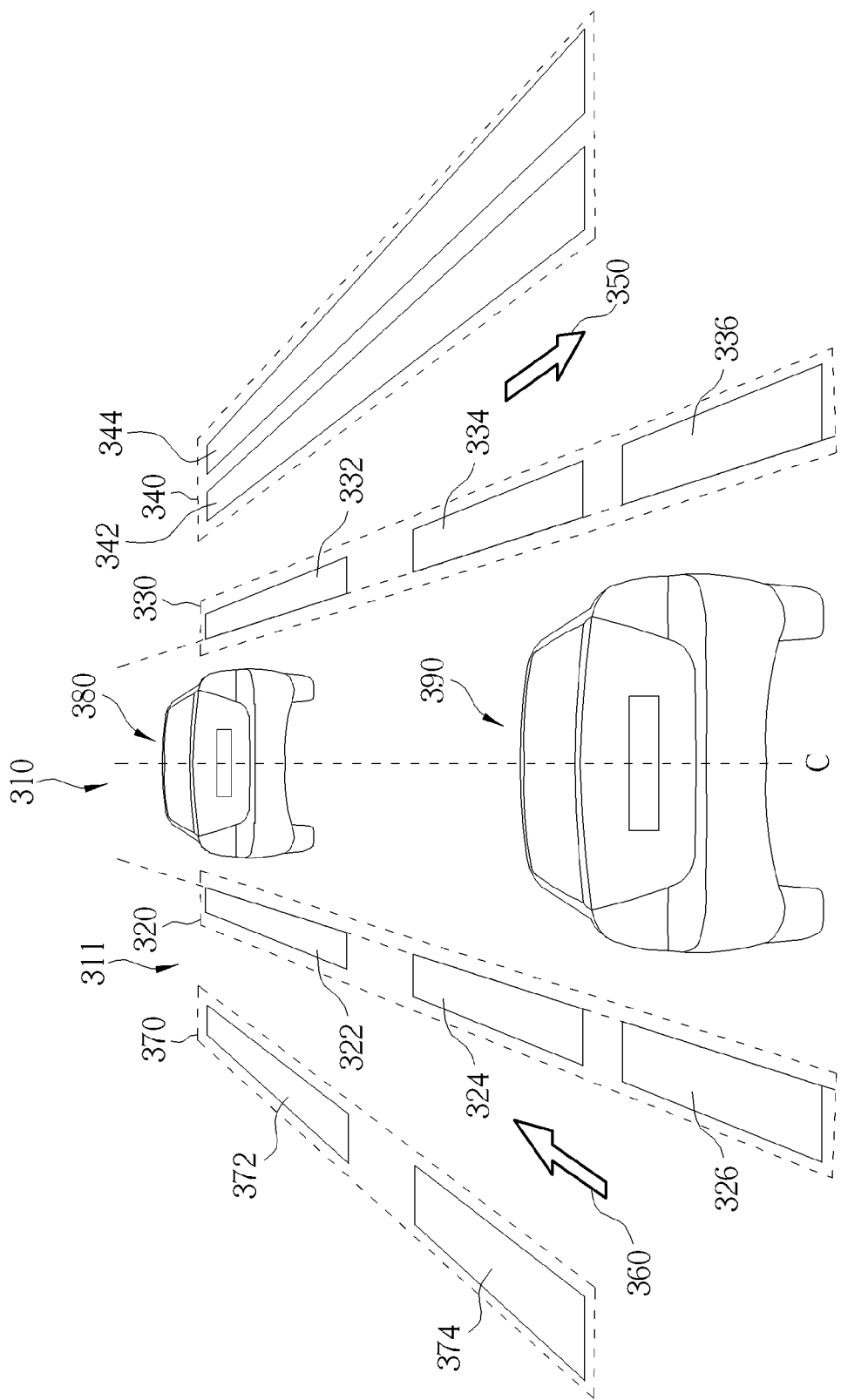
FIG. 3 shows a drive video.
Figure 4:
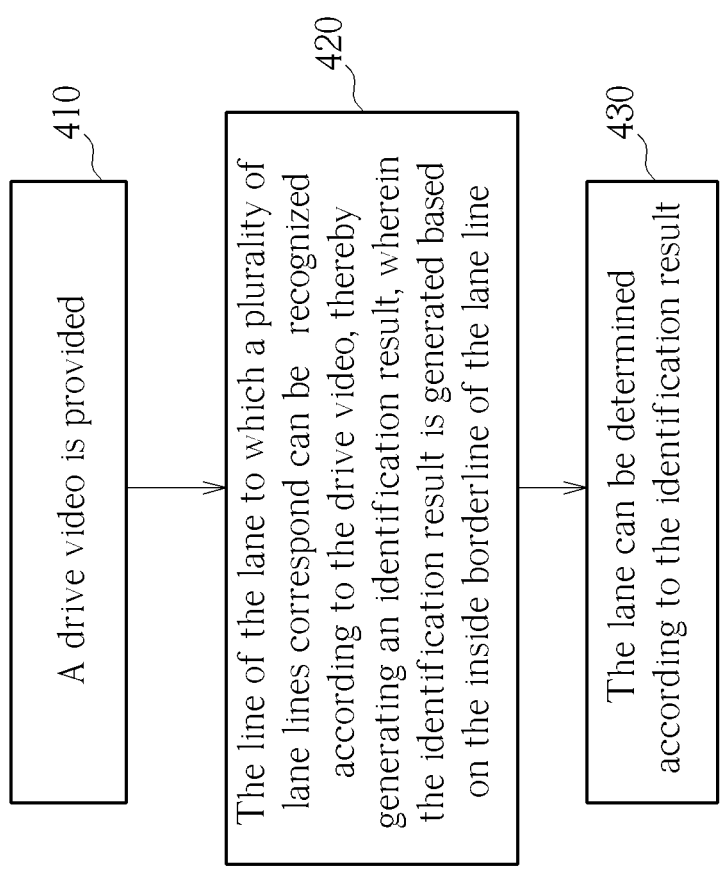
FIG. 4 is a flowchart illustrating an embodiment of the lane departure warning system of the present invention.
Figure 5:
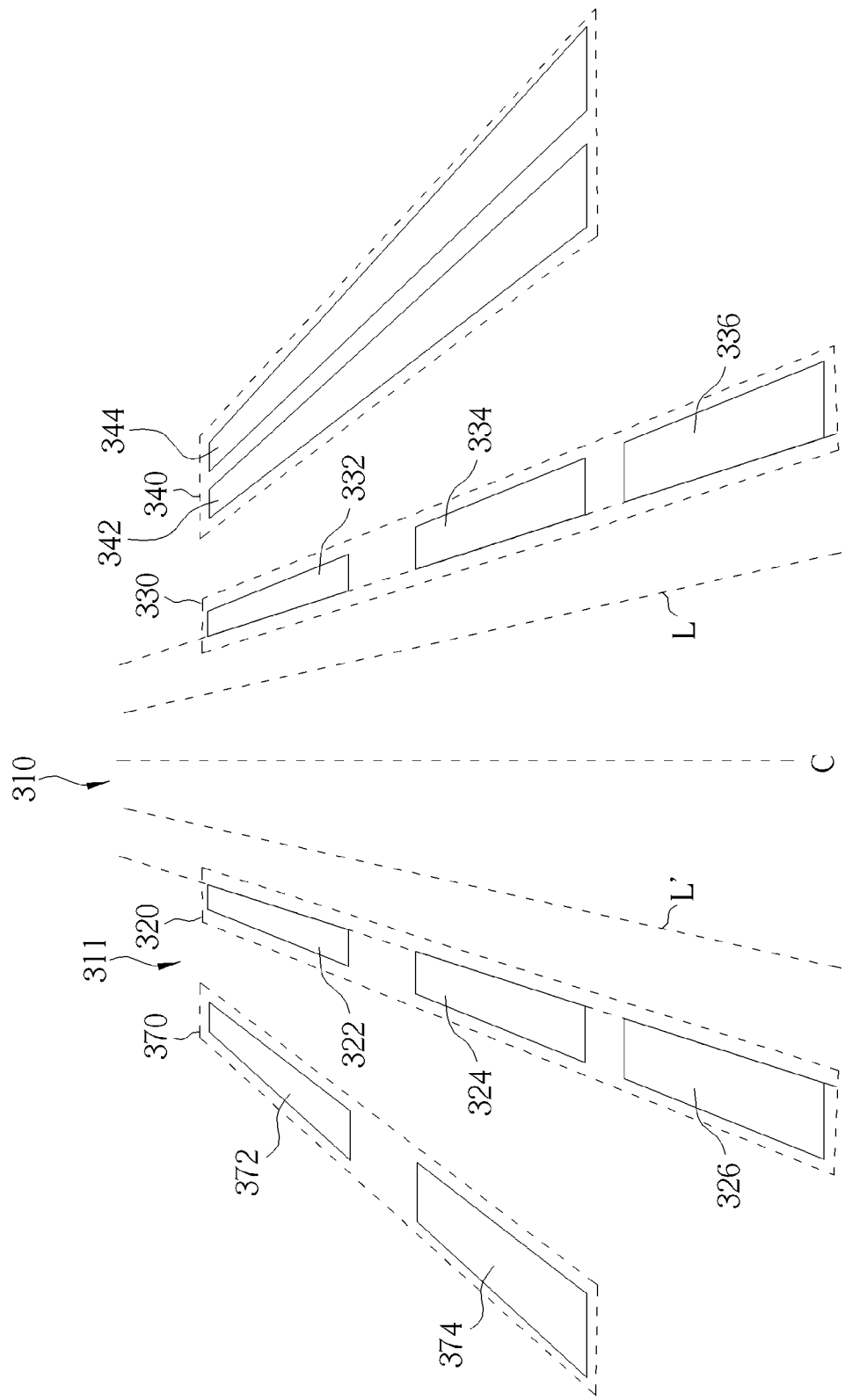
FIG. 5 shows a processed drive video.

In one embodiment, the step 420 further includes: generating a processed drive video which includes a plurality of objects. The following description will explain how to produce the processed drive video including a plurality of objects. Please refer to FIG. 5 in conjunction with FIG. 3. FIG. 3 represents an original drive video, and FIG. 5 is the processed drive video. First, when the original drive video shown in FIG. 3 is received, a pre-processing operation will be performed upon the original drive video. The pre-processing operation is arranged for filtering the drive video according to the brightness and the geometry of the objects in the drive video. Since the main material of the markings on the roadway is paint, the markings and lane lines would have similar brightness at different lanes or environments and fall within a specific brightness range regardless of sunlight exposure (day or night). Furthermore, lane lines are usually solid straight lines or broken straight lines, and the lane line would therefore present a specific geometry in the drive video. Based on these principles, the pre-processing operation can filter out the components in the drive video which do not meet the requirements of the specific brightness as well as the specific geometry. For instance, in the original drive video shown in FIG. 3, the color and the paint material of cars 380 and 390 are different from the paint material of the lane lines. Hence, each of cars 380 and 390 does not meet the requirements of the specific brightness, and its geometry is far different from that of the lane lines. The cars 380 and 390 will be filtered out during the pre-processing operation. Furthermore, although the color and the paint material of arrow markings 350 and 360 are identical to that of the lane lines, and the arrow markings 350 and 360 therefore show the similar brightness; however, the geometry of the arrow markings 350 and 360 is different from that of the lane lines, so eventually the arrow markings 350 and 360 will be filtered out in the pre-processing operation. Finally, a processed drive video, including objects 322, 324, 326, 332, 334, 336, 342, 344, 372, and 374, will be obtained in the pre-processing stage.

Figure 6:
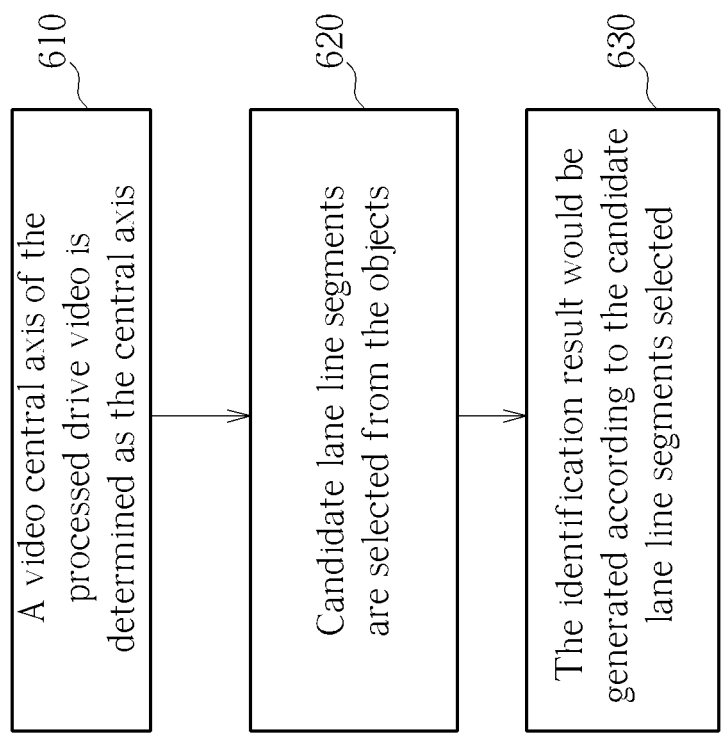
FIG. 6 is a flowchart illustrating how to generate the identification result of the lane line identification.

After the processed drive video shown in FIG. 5 is obtained, the next step is to identify whether objects 322, 324, 326, 332, 334, 336, 342, 344, 372, and 374 in FIG. 5 are lane lines or a portion of the lane lines. The flowchart shown in FIG. 6 explains how to generate the identification result according to the processed drive video. First, in step 610, a video central axis of the processed drive video is determined as the central axis C shown in FIG. 5. Next, in step 620, candidate lane line segments are selected from the objects 322, 324, 326, 332, 334, 336, 342, 344, 372, and 374, wherein the candidate lane line segments may possibly represent objects of the lane line or a portion of the lane line. Finally, in step 630, the identification result would be generated according to the candidate lane line segments selected in step 620.

In one embodiment, the step of selecting the candidate lane line segments from the objects in the processed drive video further includes: when there is no other object between an inside borderline of a specific object of the objects and the video central axis, determining that the specific object is one of the candidate lane line segments. First of all, the definitions of the video central axis and the inside borderline are explained here. The video central C represents the central position of the traveling vehicle, and the inside borderline is a borderline of an object's contour that is relatively close to the vehicle. Therefore, the inside borderline needs to be determined based on the video central axis. If an object is located at the left side of the video center axis C, then the right borderline would be regarded as the inside borderline; and if the object is located on the right side of the video center axis C, then the left borderline would be regarded as the inside borderline. After the inside borderline of each object is determined, if an object is located on the right side of the video center axis C and there is no any other object between the left borderline of the object and the video central axis C, then the object is determined to be one candidate lane line segment. Similarly, if an object is located on the left side of the video center axis C and there is no any other object between the right borderline of the object and the video central axis C, then the object is determined to be one candidate lane line segment. This process can help to exclude the lane lines which do not belong to the lane 310 whereon the vehicle is traveling. For instance, in the processed drive video shown in FIG. 5, due to the fact that there are objects 332, 334, and 336 between the left borderline of the object 342 and 344 (which are part of the right double yellow solid line 340) and the video central axis C, the objects 342 and 344 would not be treated as the lane line candidate segments. Similarly, due to the fact that there are objects 322, 324, and 326 between the right borderline of the objects 372 and 374 within the lane line 370 of the left lane 311 and the video central axis C, the objects 372 and 374 would not be treated as the lane line candidate segments. Therefore, only objects 322, 324, 326, 332, 334, and 336 will be selected as the candidate lane line segments.

Figure 7:
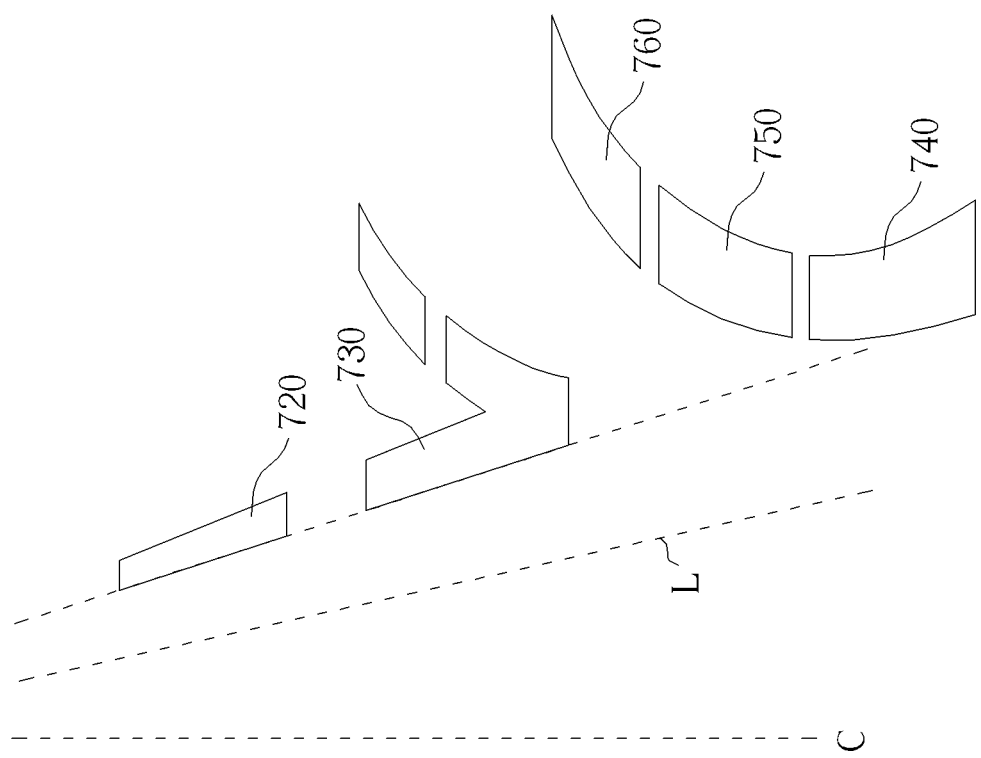
FIG. 7 is a diagram illustrating how to identify the lane lines according to the geometry relationship.

After the candidate lane line segments are decided, it is required to determine whether the candidate lane line segments are able to constitute a lane line. This is determined by checking if there is any specific geometric relationship between the candidate lane line segments. In the processed drive video shown in FIG. 5, the candidate lane line segments 322, 324, 326, 332, 334, and 336 are not arranged in a straight line. However, there must have a geometric relationship between the candidate lane line segments for constituting a complete lane line. For example, the candidate lane line segments 322, 324 and, 326, which constitute the lane line 320, are substantially parallel to a reference straight line L', and the candidate lane line segments 332, 334 and, 336, which constitute the lane line 330, are substantially parallel to a reference straight line L. Furthermore, the candidate lane line segments 322, 324 and 326 are adjacent and arranged with moderate intervals. The candidate lane line segments meeting these conditions will be regarded as a lane line. The example shown in FIG. 7 illustrates the condition that the candidate lane line segments will not be regarded as a lane line. As shown in FIG. 7, due to the fact that the objects 720-760 are located on the right side of the video central axis C and there is no other object in between the video central axis C and objects 720-760, the objects 720-760 are regarded as the candidate lane line segments. However, the objects 720, 730, and 740 are parallel to the reference straight line L, but the objects 750 and 760 are not. Hence, the objects 750 and 760 do not belong to the lane line to which the objects 720, 730, and 740 belong. Furthermore, since the spacing between object 740 and objects 720, 730 is too large (i.e., not adjacent to each other), so the object 740 does not belong to the lane line to which the objects 720 and 730 belong. The final result therefore shows that only the objects 720 and 730 belong to the same lane line.

The identification result obtained through the aforementioned steps will decide the left and right lane lines of the current driving lane. For example, in the example of FIG. 3, the left and right lane lines 320 and 330 of the current driving lane 310 are decided. Hence, the specific location of the current driving lane 310 can be confirmed, thereby achieving the purpose of lane identification. The above-mentioned process and method can be integrated into the above-described lane departure warning system and method. That is to say, the identification module 120 may use the above process to recognize lane lines by first finding out the candidate lane line segments according to the drive video and accordingly identifying the lane lines corresponding to the current driving lane to generate the identification result, and then generating the determination result according to different strategies, where the determination result indicates whether lane departure occurs. Please note that not all of the lane lines 320 and 330 are required to be identified for performing lane departure determination, as a matter of fact that it depends on the determination strategy employed by the lane departure warning system and method.

Figure 8:
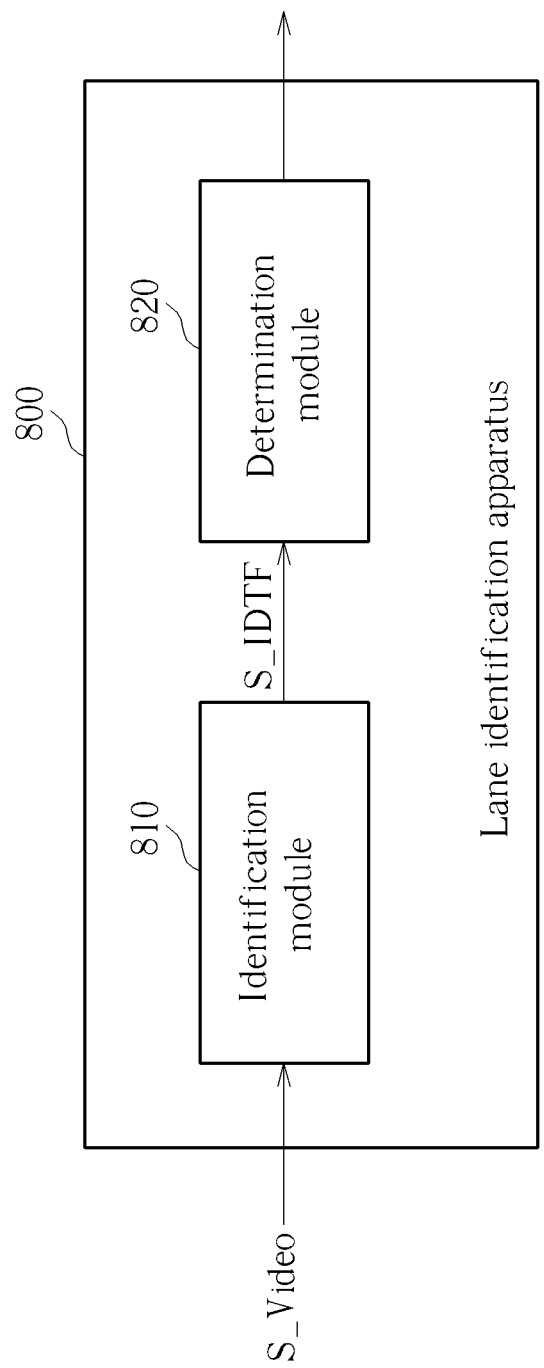
FIG. 8 is a functional block diagram illustrating a lane line identification apparatus according to an embodiment of the present invention.

Based on the above-mentioned lane identification method, a lane identification apparatus is provided in another embodiment of the present invention. Please refer to the functional block diagram shown in FIG. 8, which illustrates a lane identification apparatus according to an embodiment of the present invention. As shown in FIG. 8, the lane identification apparatus 800 includes an identification module 810 and a determination module 820. The identification module 810 is utilized to refer to a drive video S_video (possibly the lane video before or after pre-processed) for identifying a plurality of lane lines corresponding to a lane and accordingly produce an identification result S_IDFT, wherein the identification result S_IDFT is generated based on the inside borderlines of the lane lines. The identification module 820 would select a video central axis of the drive video according to the aforementioned process, and then select the lane line segments from the drive video in accordance with the video central axis. Finally, lane lines of the current driving lane would be determined to generate the identification result S_IDFT. The determination module 820 is coupled to the identification module 810, and arranged to determine the specific location of the current driving lane based on the identification result S_IDFT.

The above-mentioned lane departure warning method and land identification method may be implemented through pure software architecture, a pure hardware circuit, or through a combination of the both. For instance, the lane departure warning method and land identification method may be implemented through a processor that performs the corresponding software, through a pure hardware circuit, or through a combination of both. The processor may be a general-purpose processor or a specific processor such as a digital signal processor. The software may be stored in a computer readable medium (e.g., an optical disc, a hard disk, a flash memory, a random access memory (RAM), a read-only memory (ROM), or any other storage device which may be identified by the processor, and the software includes all kinds of programmable logics, instructions, or necessary information for the implementation of the present invention. In addition, a specific circuit realized by a hard-wired logic, a programmable logic (e.g., Field Programmable Gate Array, FPGA), a Complex Programmable Logic Device (CPLD), or an application-specific integrated circuit (ASIC) may be included in the pure hardware circuit architecture.

In summary, the present invention simplifies the process of the lane line identification and improves the accuracy of it by detecting the inside borderline of markings on the roadway and then determining whether the markings are lane lines or a portion of lane lines. Furthermore, in the lane departure warning system of the present invention, one of the determination strategies could be selected according to the vehicle speed information for providing different levels of sensitivity, thereby making the lane departure warning system of the present invention more reliable.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lane departure warning system, comprising:
an image sensing device, arranged for generating a video;
an identification module, coupled to the image sensing device, arranged for referring to the video to identify a plurality of lane lines corresponding to at least one lane and accordingly generating an identification result, wherein the identification result is generated based on specific borderlines of the lane lines; and
a determination module, coupled to the identification module, arranged for determining a determination strategy according to vehicle speed information, and generates a determination result according to the determination strategy and the identification result;
wherein the lane departure warning system determines whether to issue a warning according to the determination result;

wherein when the vehicle speed information indicates that a speed of a vehicle is within a first speed range, the determination module selects an aggressive determination strategy; and when the vehicle speed information indicates that the speed of the vehicle is within a second speed range which is different from the first speed range, the determination module selects a defensive determination strategy; and compared with the defensive determination strategy, the aggressive determination strategy makes the determination module generate the determination result which indicates the vehicle has departed from lane when the identification module identifies fewer lanes.

2. The lane departure warning system of claim 1, wherein the vehicle speed information is provided by one of a vehicle body signal and a satellite navigation system.

3. The lane departure warning system of claim 1, wherein the lane departure warning system does not issue the warning during a braking process.

4. The lane departure warning system of claim 1, wherein a specific borderline is an inside borderline of a lane whereon a vehicle is traveling.

5. The lane departure warning system of claim 1, wherein the determination strategy is determined according to driver-defined information.

6. A lane departure warning method, comprising:
    referring to a drive video to identify a plurality of lane lines corresponding to one lane and accordingly generating an identification result, wherein the identification result is generated based on specific borderlines of the lane lines;
    determining a determination strategy according to vehicle speed information, and generating a determination result, which indicates whether lane departure occurs, according to the determination strategy and the identification result, comprising:
        when the vehicle speed information indicates that a speed of a vehicle is within a first speed range, selecting an aggressive determination strategy; and
        when the vehicle speed information indicates that the speed of the vehicle is within a second speed range which is different from the first speed range, selecting a defensive determination strategy, wherein compared with the defensive determination strategy, the aggressive determination strategy makes the determination result which indicates the vehicle has departed from lane generated when the identification result indicates fewer identified lanes; and
    determining whether to issue a warning according to the determination result.

7. The lane departure warning method of claim 6, wherein the vehicle speed information is provided by one of a vehicle body signal and a satellite navigation system.

8. The lane departure warning method of claim 6, wherein the lane departure warning system does not issue the warning during a braking process.

9. The lane departure warning method of claim 6, wherein a specific borderline is an inside borderline of a lane whereon a vehicle is traveling.

10. The lane departure warning method of claim 6, further comprising:
    determining the determination strategy according to driver-defined information.

11. A lane departure warning method, comprising:
    referring to a video to identify at least one lane line corresponding to one lane and accordingly generating an identification result, wherein the identification result is generated based on specific borderlines of the at least one lane line;
    determining a determination strategy according to vehicle speed information, and generating a determination result, which indicates whether lane departure occurs, according to the determination strategy and the identification result, comprising:
        when the vehicle speed information indicates that a speed of a vehicle is within a first speed range, selecting an aggressive determination strategy; and
        when the vehicle speed information indicates that the speed of the vehicle is within a second speed range which is different from the first speed range, selecting a defensive determination strategy, wherein compared with the defensive determination strategy, the aggressive determination strategy makes the determination result which indicates the vehicle has departed from lane generated when the identification result indicates fewer identified lanes; and
    determining whether to issue a warning according to the determination result.

12. The lane departure warning method of claim 11, wherein the vehicle speed information is provided by one of a vehicle body signal and a satellite navigation system.

13. The lane departure warning method of claim 11, wherein the lane departure warning system does not issue the warning during a braking process.

14. The lane departure warning method of claim 11, wherein a specific borderline is an inside borderline of a lane whereon a vehicle is traveling.

* * * * *